April 14, 1936.　　　A. D. EITZEN　　　2,037,014

OPTICAL SYSTEM

Original Filed Feb. 10, 1933　　2 Sheets-Sheet 1

INVENTOR.
AUGUST D. EITZEN
BY Gustav Drews
ATTORNEY

April 14, 1936.   A. D. EITZEN   2,037,014
OPTICAL SYSTEM
Original Filed Feb. 10, 1933   2 Sheets-Sheet 2
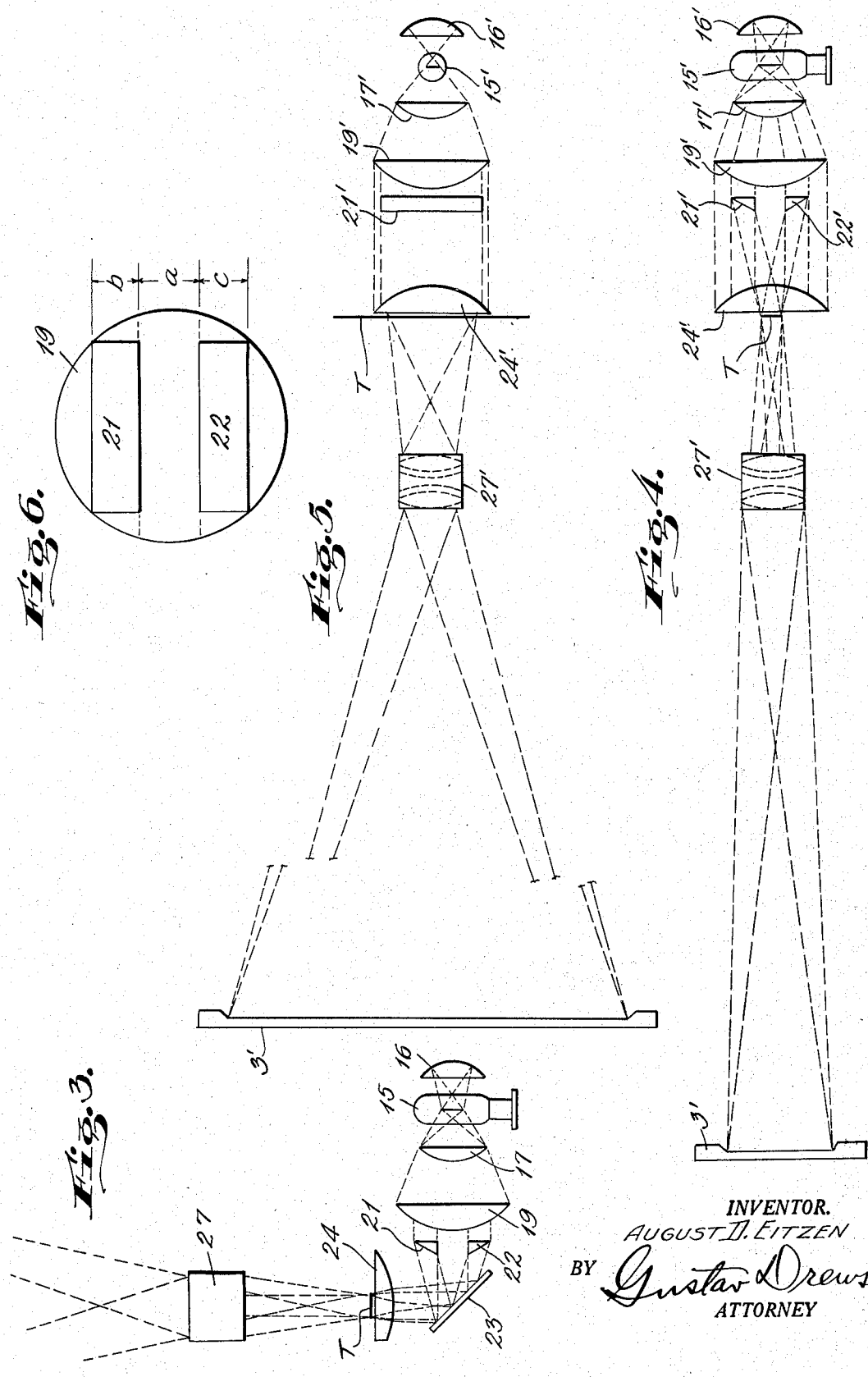
INVENTOR.
AUGUST D. EITZEN
BY Gustav Drews
ATTORNEY Patented Apr. 14, 1936

2,037,014

UNITED STATES PATENT OFFICE 2,037,014

OPTICAL SYSTEM

August D. Eitzen, Rockville Centre, N. Y., assignor to News Projection Corporation, New York, N. Y., a corporation of New York Application February 10, 1933, Serial No. 656,062
Renewed March 9, 1935

10 Claims. (Cl. 88—24)

This invention relates to optical systems in general and more especially to optical systems for stock quotation projection machines.

With stock quotation projection machines, especially of the type used for projecting the quotations produced by a ticker, teletype or the like on narrow tape, the so-called ribbon tape, the effective part of the beam of light is comparatively long and narrow, the length of which is usually at least five times the width of the same. With the ordinary projectors today in use, there is initially collected a cone shaped body of light resulting from a combination including a concave reflector, lenses and an intervening source of light, such as a filament lamp. Consequently in order to prevent light leakage, as much as two-thirds of the original light beam produced by this combination is generally cut off and lost and only about one-third of the original light beam used. When so cutting off the portion of the light beam heretofore not used, resort has been had to baffles and the like.

In view of the foregoing, the present invention aims to utilize the greater part of the light beam heretofore lost and directing it into the path of the effective light beam, thereby increasing the light intensity of the standard projectors today in use for a given amount of light collected by the light system.

To this end, the present invention further aims to provide an improved optical system including prisms for increasing the light intensity of a standard projecting machine and lamp housing.

These and other features, capabilities and advantages of the invention will appear from the subjoined detailed description of specific embodiments thereof illustrated in the accompanying drawings in which.

Fig. 3 is a diagrammatic view illustrating the path of the light rays of the embodiment illustrated in Fig. 2;

Fig. 4 is a side elevation illustrating diagrammatically the path of the light rays of another embodiment;

Fig. 5 is a plan view illustrating diagrammatically the path of the light rays of the embodiment shown in Fig. 4; and Fig. 6 is a front elevation diagrammatically illustrating the relation of the large condensing lens to the prisms.

Figure 1:
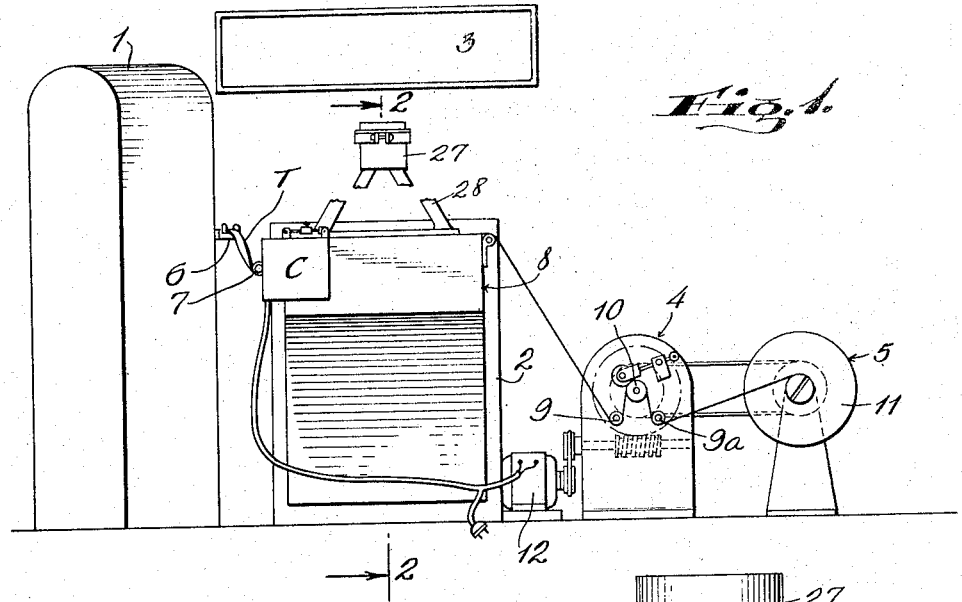
Figure 1 is a front elevation of a projection machine equipped with the present invention.

In the embodiment illustrated in Fig. 1, there is shown more or less diagrammatically a ticker 1, a lamp housing 2, a screen 3, a tape puller 4 and a tape rewind 5. The tape T issuing from the ticker 1 passes over the guide 6 to the finger 7 of the tape control C, from there across the light aperture on the extension 8, then down to the idler 9, then over the tape pulling roller 10, then under the idler 9ª and finally onto the rewind reel 11. The control C, tape puller 4 and rewind 5 are all operatively connected to the motor 12 in the usual way.

The lamp housing 2 in the present instance is provided with a support 13 having mounted thereon the lamp socket 14 of the lamp 15. To the rear of the wall of the lamp housing 2, there is preferably secured the concave reflector 16 which together with the lamp 15 directs a light beam onto the condensing lens 17 mounted at the inner end of the frame 18. The frame 18 flares outwardly as it approaches the outer wall of the housing 2 and at its outer end is secured to the front wall of the lamp housing 2. Furthermore at the outer end of the frame 18, there is secured a second condensing lens 19. The condensing lenses both have their plane faces parallel and facing the lamp 15 and their convex faces facing outwardly therefrom.

Furthermore to the inner diminished end of the frame 18, there is preferably provided a shield or light baffle 20 consisting preferably of a substantially rectangular plain sheet of metal which is preferably stained black or some other light absorbing color on the face facing the lamp.

The shield 20 however is formed so that it will permit the passage of a cone of light to strike the lens 17 to be refracted by the latter into a beam that will clear the frame 18 and engage the lens 19 to be further refracted by the lens 19 into a substantially cylindrical beam of light or beam of substantially parallel rays, see Figs. 3, 4, and 5. The latter beam of parallel rays will be divided, a medial narrow band $a$ between the prisms 21 and 22 passing direct to the inclined mirror 23 and narrow bands $b$ and $c$ above and below the band $a$ passing through the prisms 21 and 22 and being refracted by the latter to superimpose in part the band $a$ at the mirror 23. The bands $b$ and $c$ still further superimpose the band $a$ when striking the condenser 24 and finally substantially superimpose the band $a$ entirely at the light aperture 25 formed in the upper wall 26 of the extention 8.

When looking at Fig. 6, it will appear from the foregoing that if the cylindrical beam of light substantially corresponds to the lens 19, the prisms 21 and 22 will make it possible materially to increase the effective beam of light, heretofore confined to the band *a* when the beam composed of the bands *a*, *b* and *c* finally superimpose one another at the light aperture 25.

After the three bands *a*, *b* and *c* of the light beam have merged into one another at the light aperture, the combined light rays will then pass through the tape T and then pass onward through the objective lens 27 mounted in the frame 28 extending upwardly from the extension 8.

Figure 2:
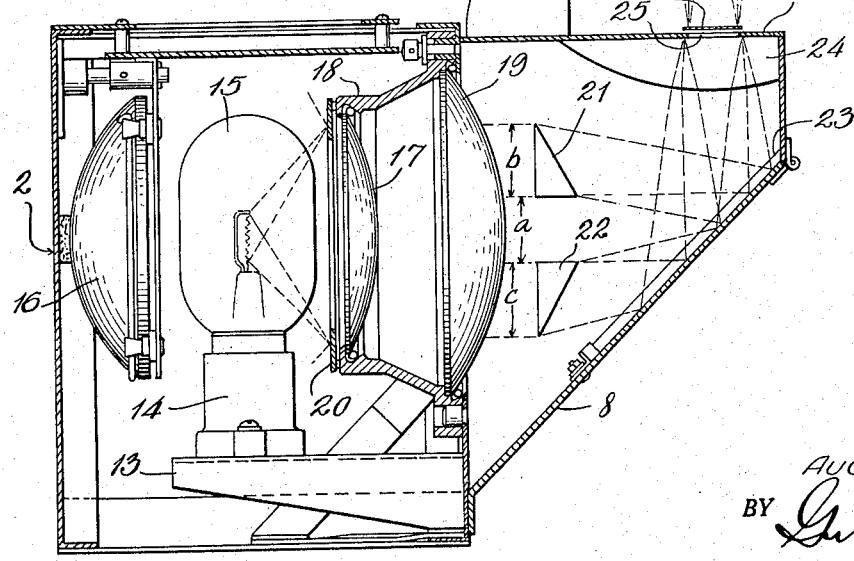
Fig. 2 is a section on the line 2—2 of Fig. 1.

Fig. 3 shows the path of the light rays diagrammatically of the embodiment illustrated in Fig. 2.

In the embodiment illustrated in Fig. 4, the light rays pass direct from the lens 19' and prisms 21' and 22' to the lens 24' instead of being deflected by a mirror, such as the mirror 23. Otherwise the embodiment of Figs. 4 and 5 is substantially identical to that illustrated in Fig. 2. In other words, in this embodiment, the lamp 15' or equivalent is the source of light which cooperates with the reflector 16' to cause a beam of light to pass through the condenser 17', from which a diverging conical beam of light will pass to the condenser 19'. The condenser 19' will converge the light rays to form a substantially cylindrical beam of light or beam of parallel rays of light, part of which will pass direct to the condenser 24' and other parts intercepted by the prisms 21' and 22' to be refracted to superimpose a medial band of light passing from the condenser 19' to the condenser 24' so that the beams of light refracted by the prisms 21' and 22' will substantially merge into the medial band of light when the same passes through the tape T. From the tape T the beam of light will pass through the objective lens 27' in the way shown and then onto the screen 3'.

With the embodiment illustrated in Fig. 1, it will be obvious that the marked surface of the tape will be inverted before passing across the light aperture 25 and after passing through the objective lens 27 be deflected by a mirror adjacent to the screen 3 to produce so-called rear projection onto a translucent screen.

In the embodiment illustrated in Fig. 4, the tape likewise is preferably inverted so that its marked surface faces the lamp, the objective lens 27' in turn so converting the image that it will appear in a correct legible manner on the screen 3' which is an opaque screen.

It is obvious that various changes and modifications may be made to the details of construction without departing from the general spirit of the invention as set forth in the appended claims.

I claim:

1. The combination with a marked tape, of a light aperture of greater length than width, means for producing a concentrated beam of light on the tape at said aperture including a condensing lens for directing a cylindrical beam of light, a second lens for receiving a medially positioned portion of said cylindrical beam of light direct from said first lens, light refracting means for intercepting laterally positioned portions of said cylindrical beam of light and directing them onto said second lens, said second lens converging the several light beam portions onto the tape portion at said light aperture, a screen, and means including an objective lens for forming on said screen an image of the markings on the tape so illuminated.

2. The combination with a marked tape, of a narrow elongated light aperture, means for producing a concentrated beam of light on the tape at said aperture including a condenser for directing a cylindrical beam of light, a second condenser for receiving a medially positioned portion of said cylindrical beam of light direct from said first condenser and directing it upon the tape at said light aperture, light refracting means for intercepting laterally positioned portions of said cylindrical beam of light and directing them onto said second condenser, said second condenser refracting said several light beam portions substantially to superimpose one another at said light aperture, a screen, and means including an objective lens for forming on said screen an image of the markings on the tape so illuminated by said several light beam portions.

3. The combination with a marked tape, of a narrow elongated light aperture, means for producing a concentrated narrow elongated beam of light on the tape at said light aperture including a lens for producing a cylindrical beam of light, a second lens for receiving a medially positioned portion of said cylindrical beam of light direct from said first lens and converging it into a light beam corresponding in dimensions to the portion of the tape exposed at said light aperture, elongated prisms spaced from one another to permit the passage of the original medially positioned light beam on said second lens and intercepting other portions of said cylindrical beam of light and directing them onto said second lens, said second lens further refracting said latter light beam portions substantially to superimpose said medially positioned light beam portion at said tape, a screen, and means including an objective lens for forming on said screen an image of the markings on said tape so illuminated by said several light beam portions.

4. The combination with a marked tape, of a narrow elongated light aperture, means for producing a concentrated narrow elongated beam of light on the tape at said aperture including a lens system for producing a cylindrical beam of light, a second lens for receiving a narrow portion of said cylindrical beam of light direct from said lens system and converging it into a light beam corresponding in dimensions to the portion of the tape exposed at said light aperture, elongated prisms for intercepting other portions of said cylindrical beam of light and directing them onto said second lens, said second lens further refracting said light beam portions substantially to superimpose said first light beam portion at said tape, a screen, and means including an objective lens for forming on said screen an image of the markings on said tape so illuminated by said several light beam portions.

5. The combination with a marked tape, of a lamp housing having a narrow elongated light aperture across which said tape is adapted to pass, light producing means mounted in said housing for producing a beam of light, a frame mounted in said housing, a lens at one end of said frame, a rectangular light and heat absorbing shield between said light producing means and said frame to obstruct the passage of the light and heat rays direct to said frame but permit the passage of a cone of light through said frame, a second lens at the outer end of said frame for receiving the cone of light and converging it into a substantially cylindrical beam of light, a third lens adjacent to said light aperture and adapted to receive a narrow portion of said cylindrical beam of light and converge it into a light cone corresponding in dimensions to the portion of the tape exposed at said light aperture, prisms intercepting other portions of said cylindrical beam of light and directing them onto said third lens, said third lens further refracting said latter light beam portions substantially to superimpose said first mentioned light beam portion at said tape, a screen, and means including an objective lens for forming on said screen an image of the markings on said tape so illuminated by said several light beam portions.

6. The combination with a marked tape, of a lamp housing having a narrow elongated light aperture across which said tape is adapted to pass, light producing means mounted in said housing for producing a beam of light, a frame mounted in said housing, a lens at one end of said frame, a rectangular light and heat absorbing shield between said light producing means and said frame to obstruct the passage of the light and heat rays direct to said frame but permit the passage of a cone of light through said frame, a second lens at the outer end of said frame for receiving the cone of light and converging it into a substantially cylindrical beam of light, a third lens adjacent to said light aperture, a deflector for receiving a narrow portion of said cylindrical beam of light and directing it onto said third lens to be converged into a light cone corresponding in dimensions to the portion of the tape exposed at said light aperture prisms intercepting other portions of said cylindrical beam of light and directing them onto said deflector to be deflected onto said third lens, said third lens further refracting said latter light cone portions substantially to superimpose said first mentioned light beam portion at said tape, a screen, and means including an objective lens for forming on said screen an image of the markings on said tape so illuminated by said several light beam portions.

7. The combination with a marked tape, of a lamp housing having a narrow elongated light aperture across which said tape is adapted to pass, a source of light including a lamp and a reflector mounted in said lamp housing for producing a beam of light, an outwardly flaring conical frame mounted in said housing a lens at the inner narrow end of said frame, a rectangular light absorbing shield mounted on the inner end of said frame to obstruct the passage of the light rays direct to said frame from said light source but permit the passage of a cone of light through said frame, a second large lens at the outer end of said frame for receiving the cone of light and converging it into a substantially cylindrical beam of light, a third lens adjacent to said light aperture, a deflector for receiving a narrow beam of light from said second lens and directing it onto said third lens in line with said light aperture to be refracted by said third lens onto the tape at said light aperture, prisms spaced from one another to permit the passage of the aforesaid narrow beam of light to said deflector and intercepting other portions of said cylindrical beam of light and directing them onto said deflector to be in turn deflected onto said third lens, said third lens further refracting said latter narrow light beam portions substantially to superimpose said first mentioned light beam portion at said tape, a screen, and means including an objective lens for forming on said screen an image of the markings on said tape so illuminated by said several light beam portions.

8. The combination with a narrow elongated light aperture, of a narrow marked tape disposed at said light aperture, means for producing a concentrated narrow elongated beam of light on the tape at said aperture including a lens for producing a cylindrical beam of light, a second lens, and a plurality of elongated prisms for intercepting portions of said cylindrical beam of light and converging them to overlap one another when passing through said second lens, said second lens converging the light beam portions so received into a light beam corresponding in dimensions to the portion of the tape exposed at said light aperture to form an image impressed light beam; a screen; and means for receiving the image impressed light beam so formed and directing it onto said screen to form images of the markings on the tape so illuminated.

9. The combination with a narrow elongated light aperture, of a narrow marked tape disposed at said light aperture, means for producing a concentrated narrow elongated beam of light on the tape at said light aperture including a lens for producing a cylindrical beam of light, a lens for receiving a portion of said cylindrical beam of light direct from said first lens and converging it into a light beam corresponding in dimensions to the portion of the tape exposed at the light aperture, light refracting means for intercepting another portion of said cylindrical beam of light and directing it to overlap said first light beam portion, said second lens converging the several light beam portions so received onto the tape portion at said light aperture to form an image impressed light beam, a screen, and means for receiving the image impressed light beam so formed by said second lens and directing it onto said screen to form images of the markings on the tape so illuminated.

10. The combination with a narrow elongated light aperture, of a narrow marked tape disposed at said light aperture, means for producing a concentrated narrow elongated beam of light on the tape at said aperture including a lens for producing a main beam of light, means including a second lens for receiving a portion of said main beam of light and converging it into a light beam corresponding in dimensions to the portion of the tape exposed at said light aperture, light refracting means for intercepting another portion of said main beam of light and directing it to overlap said first light beam portion, said second lens converging the several light beam portions onto the tape portion at said light aperture to form an image impressed light beam, and means including a screen for receiving the image impressed light beam so formed and produce images of the markings on the tape so illuminated.

AUGUST D. EITZEN.